G. E. ABBOTT.
BALL ROLLING MACHINE.
APPLICATION FILED MAR. 6, 1909.

1,017,125.

Patented Feb. 13, 1912.
2 SHEETS—SHEET 2.

WITNESSES:
M. E. O'Neill
A. C. Goodrich

INVENTOR.
G. E. Abbott,
BY Chas. T. Schmelz
ATTORNEY.

UNITED STATES PATENT OFFICE.

GEORGE E. ABBOTT, OF HARTFORD, CONNECTICUT.

BALL-ROLLING MACHINE.

1,017,125.  Specification of Letters Patent.  Patented Feb. 13, 1912.

Application filed March 6, 1909. Serial No. 481,566.

*To all whom it may concern:*

Be it known that I, GEORGE E. ABBOTT, a citizen of the United States, and resident of Hartford, in the county of Hartford and State of Connecticut, have invented certain new and useful Improvements in Ball-Rolling Machines, of which the following is a full, clear, and exact specification.

This invention relates to machines for rolling balls, and more especially to those adapted for receiving and rounding balls made from metal which in its original form consists of rods from which sections are cut off, these sections subsequently being subjected to the action of dies whereby an approximately spherical form will be imparted thereto.

My invention has for one of its objects, the provision of a machine of this character which comprises a hopper into which a number of blanks are placed, and are then fed gravitatively in between a pair of coöperative platens whereby the balls are shaped as required.

My invention has, furthermore, for its object the provision of mechanisms whereby either one or both of said platens may be rotated on their own axes; while one of them is revolved around a fixed axis which is eccentrically disposed to its axis of rotation.

Further objects of the invention will hereinafter appear.

The invention has been clearly illustrated in the accompanying drawings, in which similar characters denote similar parts, and in which—

Figure 1:
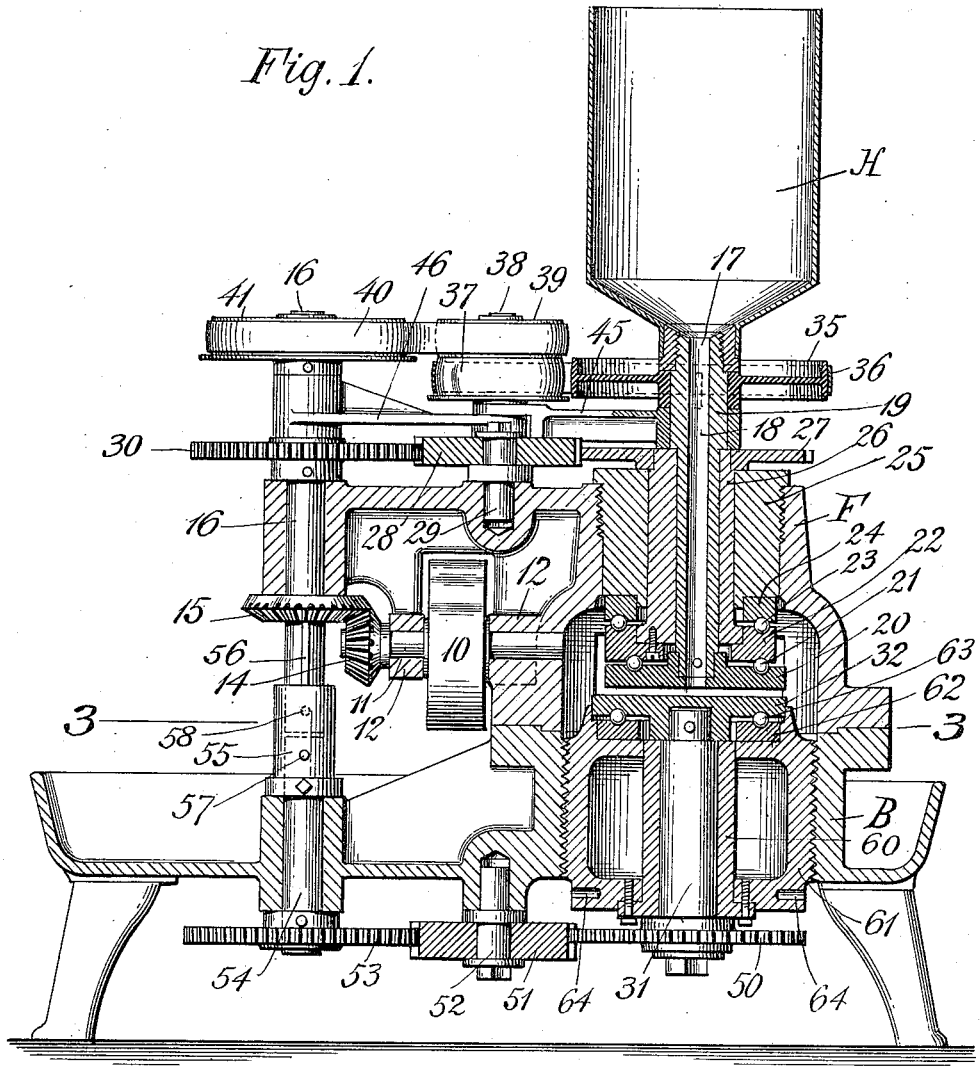
Figure 2:
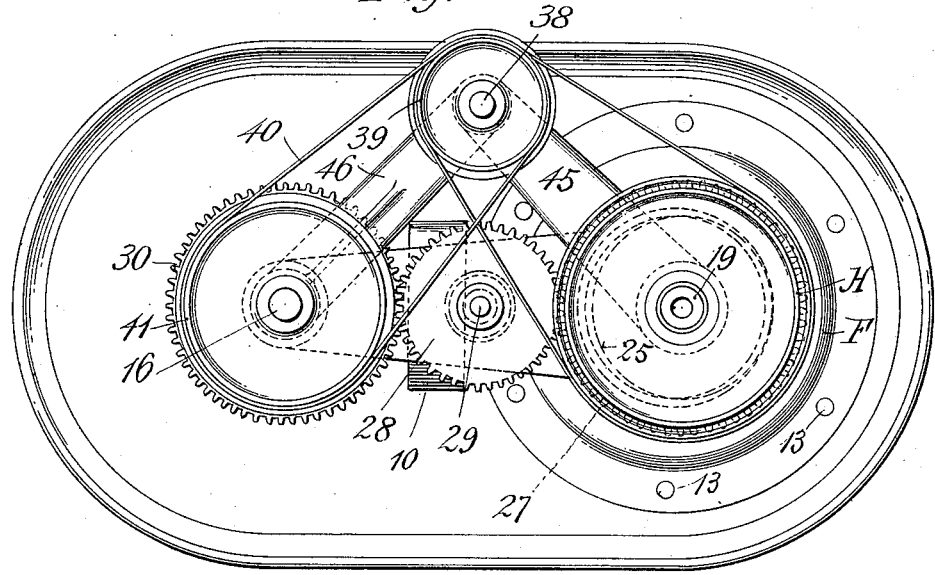
Figure 3:
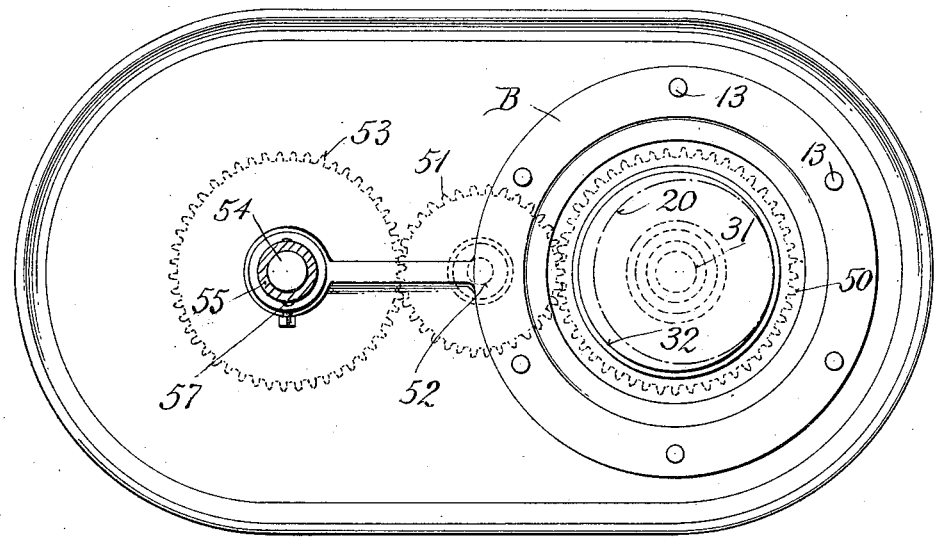

Figure 1 represents a central longitudinal section of a machine embodying my invention. Fig. 2 is a top view thereof, and Fig. 3 is a plan of the lower portion of the machine taken on line 3, 3 of Fig. 1.

In the drawings, the numeral 10 denotes the main driving-pulley of the machine to which power may be imparted from any convenient source. A pulley 10 is mounted on a shaft 11 journaled in bearings 12 which constitute a part of the upper frame F and which may be secured to the base B, as for instance by bolts 13 (see Fig. 3).

The shaft 11 carries at its end a pinion 14 in engagement with a bevel gear 15 secured upon a vertically disposed shaft 16 which constitutes a primary element whereby the upper ball rolling member is rotated and revolved, as will hereinafter appear. The balls to be acted upon by my improved machine are placed in a hopper H having at its lower end a mouth 17 in communication with a channel 18 provided in a tubular spindle 19 which at its lower end carries the upper ball rolling member 20. This member consists substantially of a disk of hardened metal and is provided with annular grooves to receive a series of bearing balls 21 interposed between the disk 20 and a race-ring 22 which constitutes an intermediate thrust resisting member and has at its upper face an annular groove to receive bearing balls 23 in engagement with the under face of a ring 24. This ring 24 is rigidly secured to a bearing block 25 preferably in screw threaded engagement with the frame F and rigidly held therein. The block 25 serves as a bearing for a vertically disposed quill or sleeve 26 which at its lower end has secured thereto the thrust member 22 above mentioned and which at its upper end carries a gear 27 in engagement with an intermediate 28 which is journaled on a stud 29 held in the frame F and which is also in engagement with a gear 30 secured upon the shaft 16 previously described.

From this organization it will be apparent that the rotation of the driving pulley 10 will result in rotating the quill 26 and consequently the intermediate thrust member 22, this rotation being on an axis in alinement with the axis of a lower shaft 31, at the upper end of which the lower rolling platen 32 is rigidly secured.

By referring to Figs. 1 and 2, it will be seen that the axis of the tubular shaft 19 is disposed eccentrically relatively to the axis of the quill 26 so that therefore said spindle 19 will be revolved bodily around the axis of said quill, and a similar movement will result of the upper platen 20 relatively to the lower platen 32. The result of this action would be to roll the balls (not shown) which are interposed between the platens 20 and 32 to be rolled into spherical shape by the machine, in one direction only, the spindle 19 being non-rotatively supported in the quill 26. Now in order to obviate this difficulty and to subject the balls to be rolled, to movements in all directions which constantly change, means are provided for rotating the spindle 19 in the quill 26. These means consist preferably of a pulley 35 secured to the upper end of the spindle 19 and driven by a belt 36 from a pulley 37 which is secured on a movable stud 38 provided also with a pulley 39 to which motion is imparted by a belt 40 from a pulley 41 on the shaft 16 previously referred to.

From the foregoing it will be understood that as a matter of fact the spindle 19 is revolved bodily around the axis of and with the quill 26, while the axis of the primary driving pulley 16 is stationary, and in order to compensate for this revolving movement, and to keep the belts 36 and 40 tight on their pulleys, I deem it advantageous to let the stud 38 constitute the pivot pin for uniting a pair of links 45 and 46, respectively, the former 45 of which connects the stud 38 with the spindle 19 while the latter 46 connects said stud 38 with the shaft 16. We, therefore, have not only a revolving movement of the spindle 19 around the axis of and with the quill 26; but, furthermore, the spindle 19 itself is rotated in the quill so that the disk or platen 20 will move the balls to be rolled in all directions which are also constantly changing on the supporting platen 32.

The ball bearings 21 and 23 are well adapted to resist the upward pressure exerted on the platen 20 during the rolling operation, and obviate all excessive friction between the running parts, because the upward pressure of the quill against the bearing block 25 will be taken care of by the bearing balls 23 and again the pressure of the disk against the quill-ring 22 will be taken care of by the balls 21.

Under ordinary circumstances, the lower supporting platen 32 may remain stationary, but for finishing purposes I deem it preferable to rotate this platen as well as the upper rolling platen 20. The means for accomplishing this end consists substantially of a gear 50 secured to the lower end of the spindle 31 and obtaining its rotative movement through an intermediate gear 51 journaled on a stud 52 and driven by a gear 53 which is secured to a shaft 54 in axial alinement with the shaft 16, above mentioned. For the purpose of operating, when desired, the shaft 54 as well as the shaft 16 I have provided a coupling-sleeve 55 which has a sliding key-connection 56 with the shaft 16 and a pin-connection 57 with the shaft 54. In order to facilitate the disengagement or disconnection of the shafts 54 and 16, it will be only necessary to withdraw the pin 57, and if desired, the coupling-sleeve 55 may then be raised so that the pin 57 may enter an aperture 58 provided therefor in the shaft 16 so as to hold the coupling-sleeve in its raised or disengaged position.

By the organization of the several elements, I am enabled not only to "rough-out" the balls to be rolled, but, furthermore, to finish the same very closely to a standard gage or size.

The machine is also adapted for rolling balls of various sizes according to the way it is set and in its preferred form the shaft 31 is journaled in a sleeve 60 secured to a thrust member 61 provided at its upper end with a race 62 between which and the platen 32 a series of bearing balls 63 are placed to withstand the thrust incident to the ball rolling operation. The member 61 is preferably in screw threaded engagement with the base B and may be turned so as to leave the required space between the platens by pins adapted to be inserted in apertures 64 provided therefor near the lower edge of the member 61, it being understood, however, that during the ball rolling operation this member is stationary.

Such changes as fall within the scope of the appended claims may be made in the construction of the several parts, and in their general organization relatively to each other, without departing from the spirit of the invention.

I claim:

1. In a ball rolling machine, the combination with a supporting platen, of a rolling disk coöperative therewith, means for rotating said disk, and means for revolving said disk around an axis disposed eccentrically to the rotation axis thereof.

2. In a ball rolling machine, the combination with a supporting platen, and means for rotating the same in a horizontal plane, of a rolling disk coöperative with said platen, means for rotating said disk, and means for revolving said disk on an axis disposed eccentrically to the rotation axis thereof.

3. In a ball rolling machine, the combination with a supporting platen having a horizontal face, and means for rotating said platen on a vertical axis, of a rolling disk disposed above said platen and having a face coöperative with that of the platen, means for rotating said disk on an axis eccentrically disposed relatively to the platen-axis, and means for revolving said disk on an axis in alinement with the rotation axis of the platen.

4. In a ball rolling machine, the combination with a rolling disk, means for rotating said disk, and means for revolving said disk around an axis disposed eccentrically to the rotation axis thereof, of a supporting platen coöperative with said disk, and means for varying the position of said platen relatively to the disk for increasing or decreasing the distance between said platen and the disk.

5. In a ball rolling machine, the combination with a rolling disk, and means for rotating said disk, and means for revolving said disk around an axis disposed eccentrically to the rotation axis thereof, of a supporting rolling-platen coöperative with said disk, and means for varying the position of one of said rolling elements relatively to the other for increasing or decreasing the distance between said platen and the disk.

6. In a ball rolling machine, the combination with a platen, and means for rotating the same, of a rolling disk coöperative with said platen, and means for rotating said disk on an axis disposed eccentrically to the rotation axis of the platen.

7. In a ball rolling machine, the combination with a platen, and means for rotating the same, of a rolling disk coöperative with said platen, means for rotating said disk on an axis disposed eccentrically to the rotation axis of the platen, and means for varying the distance between said platen and the disk.

8. In a ball rolling machine, the combination with a platen rotatable on a vertical axis, of a rolling disk coöperative with said platen, means for rotating said disk on an axis disposed eccentrically to the rotation axis of the platen, and means controlled by the disk-rotating means for rotating said platen.

9. In a ball rolling machine, the combination with a platen rotatable on a vertical axis, of a rolling disk coöperative with said platen and rotatable on an axis disposed eccentrically to the rotation axis of the platen, and means for rotating both, the platen and the disk, simultaneously and in the same direction.

10. In a ball rolling machine, the combination with a platen rotatable on a vertical axis, of a rolling disk coöperative with said platen and rotatable on an axis disposed eccentrically to the rotation axis of the platen, means for rotating both, the platen and the disk, simultaneously and in the same direction, and means for varying the distance between said platen and the disk.

11. In a ball rolling machine, the combination with a platen, of a rolling disk coöperative therewith, means for rotating said disk, means for revolving said disk around an axis disposed eccentrically to the rotation axis thereof, and means for moving said platen relatively to the disk.

12. In a ball rolling machine, the combination with a platen, and means for rotating the same, a tubular spindle secured thereto, a hopper carried by said spindle, and means for rotating said spindle on an axis disposed eccentrically to the rotation axis of the platen.

13. In a ball rolling machine, the combination with a platen, and means for rotating the same, of a rolling disk coöperative therewith, a tubular spindle secured to said disk, a support for the spindle, a thrust member interposed between said disk and the spindle support, and means for rotating said spindle on an axis disposed eccentrically to the rotation axis of the platen.

14. In a ball rolling machine, the combination with a platen, and means for rotating the same, of a rolling disk coöperative therewith, a spindle secured to said disk, a rotatable quill for eccentrically supporting said spindle and having its rotation axis in alinement with the rotation axis of the platen, means for rotating the quill, and means for rotating said spindle.

15. In a ball rolling machine, the combination with a platen, and a vertical spindle for rotating the same, of a rolling disk, a spindle secured thereto, a rotatable quill having its rotation axis in alinement with the rotating axis of the platen and supporting said spindle eccentrically relatively to its own rotation axis, mechanism for rotating the platen spindle and the quill simultaneously, and means for rotating the disk spindle.

16. In a ball rolling machine, the combination with a platen, and a vertical spindle for rotating the same, of a rolling disk, a spindle secured thereto, a rotatable quill having its rotation axis in alinement with the rotation axis of the platen and supporting said spindle eccentrically relatively to its own rotation axis, a power shaft disposed in parallelism with the rotation axis of the platen and spindle, independent gearing for rotating said quill and the platen spindle simultaneously, and independent driving mechanism for rotating said spindle from said shaft.

17. In a ball rolling machine, the combination with a platen, and a vertical spindle for rotating the same, of a rolling disk, a spindle secured thereto, a rotatable quill having its rotation axis in alinement with the rotation axis of the platen and supporting said spindle eccentrically relatively to its own rotation axis, a power shaft disposed in parallelism with the rotation axis of the platen and spindle, independent gearing for rotating said quill and the platen spindle simultaneously, and independent driving mechanism for rotating said spindle from said shaft, said driving mechanism including a pulley on the shaft, a pulley on the spindle, intermediate pulleys connected with said driving pulleys, respectively, and a linked support for said intermediate pulleys and for maintaining the driving mechanism in proper operation during the revolving movement of said spindle around the axis of said quill.

18. In a ball rolling machine, the combination with a platen, and a vertical spindle for rotating the same, of a rolling disk, a spindle secured thereto, a rotatable quill having its rotation axis in alinement with the rotation axis of the platen and supporting said spindle eccentrically relatively to its own rotation axis, a power shaft disposed in parallelism with the rotation axis of the platen and spindle, independent gearing for rotating said quill and the platen spindle simultaneously, and independent driving mechanism for rotating said spindle from said shaft, said driving mechanism including a pulley on the shaft, a pulley on the spindle, intermediate pulleys connected with said driving pulleys, respectively, and a linked support for said intermediate pulleys and for maintaining the driving mechanism in proper operation during the revolving movement of said spindle around the axis of said quill, and means for varying the distance between the platen and the disk.

GEORGE E. ABBOTT.

Witnesses:
 CHAS. F. SCHMELZ,
 MARGARET E. O'NEILL.

---

Copies of this patent may be obtained for five cents each, by addressing the "Commissioner of Patents, Washington, D. C."